(12) United States Patent
Renganarayana et al.

(10) Patent No.: US 9,069,545 B2
(45) Date of Patent: Jun. 30, 2015

(54) RELAXATION OF SYNCHRONIZATION FOR ITERATIVE CONVERGENT COMPUTATIONS

(75) Inventors: Lakshminarayanan Renganarayana, Elmsford, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 13/184,718

(22) Filed: Jul. 18, 2011

(65) Prior Publication Data

US 2013/0024662 A1    Jan. 24, 2013

(51) Int. Cl.
*G06F 9/44* (2006.01)
*G06F 9/30* (2006.01)
*G06F 9/52* (2006.01)
*G06F 9/45* (2006.01)

(52) U.S. Cl.
CPC .......... *G06F 9/3004* (2013.01); *G06F 9/30087* (2013.01); *G06F 9/30185* (2013.01); *G06F 9/52* (2013.01); *G06F 8/458* (2013.01)

(58) Field of Classification Search
None
See application file for complete search history.

(56) References Cited

U.S. PATENT DOCUMENTS 8,190,807 B2 *    5/2012   Reid et al. .................... 711/3

* cited by examiner

*Primary Examiner* — Chuck Kendall
(74) *Attorney, Agent, or Firm* — Scully, Scott, Murphy & Presser, P.C.; Jennifer Davis, Esq.

(57) ABSTRACT

Systems and methods are disclosed that allow atomic updates to global data to be at least partially eliminated to reduce synchronization overhead in parallel computing. A compiler analyzes the data to be processed to selectively permit unsynchronized data transfer for at least one type of data. A programmer may provide a hint to expressly identify the type of data that are candidates for unsynchronized data transfer. In one embodiment, the synchronization overhead is reducible by generating an application program that selectively substitutes codes for unsynchronized data transfer for a subset of codes for synchronized data transfer. In another embodiment, the synchronization overhead is reducible by employing a combination of software and hardware by using relaxation data registers and decoders that collectively convert a subset of commands for synchronized data transfer into commands for unsynchronized data transfer.

30 Claims, 8 Drawing Sheets

RELAXATION OF SYNCHRONIZATION FOR ITERATIVE CONVERGENT COMPUTATIONS

BACKGROUND

The present disclosure generally relates to parallel computing, and particularly to methods of relaxing synchronization of data access during parallel computing, and systems for implementing the same, and machine readable storage media encoding a program for implementing the same.

Emerging applications in computing, particularly in the area of data analytics, predominantly use iterative convergence techniques to arrive at the desired solution. Typically, the computation consists of a set of iterations, each of which can be spawned as an individual thread which computes largely using data private to that thread, and globally synchronizing to contribute to the overall solution at a later step. In such scenarios, the application scales with the number of processors employed in parallel computing by utilizing multi-threaded concurrent execution of the iterations. However, one of the scalability challenges is the synchronization overhead which, in the worst case, can be the dominant portion of the program execution time.

One method for addressing the scalability problem in parallel computing is the privatization method. In the privatization method, multiple copies of the data are made so that each of the executing threads performs all the updates in the local copy. When all the iterations are complete, the master thread coordinates to merge all the updates from the other threads, and determines the convergence criteria for the overall solution. As the size of the data increases, it becomes difficult to scale to a large number of threads using this approach because the copying results in data bloat, and puts a strain on the memory bandwidth.

Another method for addressing the scalability problem in parallel computing is the lock-free synchronization method. The lock-free synchronization method employs atomic instructions (such as compare-and-swap) so that the overhead of synchronization is reducible. However, the method is limited to atomic operations on word-size data objects. For updating larger quantities of data, this method cannot be used directly, and hence the significant synchronization overhead remains.

Yet another method for addressing the scalability problem in parallel computing is the transaction-based synchronization method. In the transaction-based synchronization method, transactions can be considered as coarse-grain synchronization, and they offer reduction in synchronization overhead using speculation. However, not all application domains are amenable to this synchronization method. Furthermore, it is possible that the speculation, if incorrect, could lead to expensive rollback and recovery. Thus, the transaction-based synchronization method, if employed by itself, provides only a limited solution to the scalability problem.

BRIEF SUMMARY

Systems and methods are disclosed that allow atomic updates to global data to be at least partially eliminated to reduce synchronization overhead in parallel computing. A compiler analyzes the data to be processed to selectively permit unsynchronized data access for at least one type of data. A programmer may provide a hint to expressly identify the type of data that are candidates for unsynchronized data transfer. In one embodiment, the synchronization overhead is reducible by generating an application program that selectively substitutes codes for unsynchronized data access for a subset of codes for synchronized data access. In another embodiment, the synchronization overhead is reducible by employing a combination of software and hardware by using relaxation data registers and decoders that collectively convert a subset of commands for synchronized data access into commands for unsynchronized data access.

Reduction of atomic updates can be applied either at the fine-grain level or at a coarse-grain "transaction" level. Synchronization overhead reduction can be effected independent of the size of the atomic data update. Programmer specified hints can allow the application to run either with full synchronization, or with reduced synchronization based on the contents of the hints. The scalability challenges of synchronization can be overcome by exploiting the nature of iterative convergence used by the application to arrive at the desired solution. These methods can also be applied to transaction-based synchronization.

According to an aspect of the present disclosure, a method of relaxing synchronization in parallel computing is provided. The method includes: providing a system including a plurality of processors, the plurality of processors including at least one processor containing relaxation data registers and a decoder; generating an application program from a source program, wherein the application program includes an instruction for storing data representing a mode of synchronization relaxation in one of the relaxation data registers; and running the application program in the system to store the data in the relaxation data registers, wherein the system decodes at least one command in the application program for synchronized data access between processors in the system as at least one command for unsynchronized data access based on the stored data in the relaxation data registers. A loader in a processor can load the relaxation data registers for each iterative convergent computation based on command line arguments.

According to another aspect of the present disclosure, another method of relaxing synchronization in a parallel computing system is provided. The method includes: providing a system including a plurality of processors, the plurality of processors including at least one processor containing relaxation data registers and decoders; providing an application program and a set of parameters, wherein the set of parameters include values for storing data representing a mode of synchronization relaxation in one of the relaxation data registers; and running the application program in the system to store the data in the relaxation data registers, wherein the system decodes at least one command in the application program for synchronized data access between processors in the system as at least one command for unsynchronized data access based on the stored data. The set of parameters can be provided to a system running the application program as a direct input, which can be provided manually or by an automated system configured to provide a direct input to the system running the application program.

According to even another aspect of the present disclosure, another method of relaxing synchronization in parallel computing is provided. The method includes: providing a compiler module that enables recognition of a compiler directive for selective relaxation of synchronization during compilation; providing a source program for an application, the source program including at least one instance of the compiler directive; generating, by employing a compiler program that runs in at least one computing means, an application program from the source program by compiling the source program, wherein at least one command for synchronized data access in the source program is compiled as at least one command for unsynchronized data access in the application program; and running the application program in a system including a plurality of processors and configured for parallel computing.

According to yet another aspect of the present disclosure, a system for parallel computing is provided. The system includes: a plurality of processors configured to run an application in a parallel computing mode, wherein at least one of the plurality of processors includes relaxation data registers and a decoder that is configured to either convert a command for synchronized data access in an application program into a command for unsynchronized data access or transmit the command for synchronized data access unmodified based on contents of data stored in the relaxation data registers.

According to still another aspect of the present disclosure, at least one non-transitory machine readable data storage medium embodying a plurality of programs is provided. The plurality of programs includes: a compiler module for enabling recognition of a compiler directive for selective relaxation of synchronization during compilation; and a compiler configured to use the compiler module to recognize the compiler directive and to compile at least one command for synchronized data access in a source program as at least one command for unsynchronized data access in an application program upon detection of the compiler directive for selective relaxation of synchronization.

DETAILED DESCRIPTION

As stated above, the present disclosure relates to methods of relaxing synchronization of data access during parallel computing, and systems for implementing the same, and machine readable storage media encoding a program for implementing the same, which are now described in detail with accompanying figures. Like and corresponding elements mentioned herein and illustrated in the drawings are referred to by like reference numerals. The drawings are not necessarily drawn to scale.

As used herein, a "synchronized data access" is an operation in parallel computing that employs exclusive access to the data that is transferred between a unit from which data is transferred and a unit to which the data is transferred.

As used herein, an "unsynchronized data access" is an operation in parallel computing that employs non-exclusive access to the data that is transferred between a unit from which data is transferred and a unit to which the data is transferred.

As used herein, an "atomic instruction" is an instruction that requires synchronized data access.

As used herein, a "non-atomic instruction" is an instruction that does not require synchronized data access, i.e., allows unsynchronized data access.

As used herein, "synchronization relaxation" is substitution, either fully or partially, of atomic instructions with non-atomic instruction(s).

As used herein, "selective synchronization relaxation" is a conditional substitution, based on a set of predefined criteria, of atomic instructions with non-atomic instructions.

As used herein, a "hint" is a code in a source program indicating permissibility of selective synchronization relaxation.

As used herein, a "frequency of synchronization relaxation" is the ratio of the number of substitutions of atomic instructions with non-atomic instructions to the occurrences of all atomic instructions in a source code.

As used herein, a "frequency of selective synchronization relaxation" is the ratio of the number of conditional substitutions of atomic instructions with non-atomic instructions based on a set of predefined criteria to the occurrences of all atomic instructions in a source code.

As used herein, a "compiler module" is a software program that is used as a part of the compiler to enable the recognition, processing and related optimization of the synchronization relaxation compiler directives.

As used herein, a "synchronized data access" or "unsynchronized data access" refers to exclusive or non-exclusive, respectively, access of data via a plurality of mechanisms that includes: memory access, communication via messages, and disk access.

As used herein, a "loader" or a "loader module" refers to executable program that is used by a compiler or independently to prepare any program for execution.

As used herein, a "quality condition" refers to a set of instructions provided in a source code for determining whether a solution to be generated from an application program derived from the source program is an acceptable solution. A quality condition typically examines a convergence property of a solution to be generated from the application program.

In broad terms, the methods and systems of the present disclosure can be employed to reduce the synchronization overhead for a class of parallel programs identified as Iterative Convergent Computations (ICC), which refer to programs that consists of iterations (loops) with a convergence test as criterion for completion of execution. Thus, computations are repeatedly performed until the convergence criteria are met in the ICC. The parallel execution of these iterations by threads normally involves synchronization points to exchange data among parallel computational threads.

The methods of the present disclosure take advantage of the observation that there are cases in which meaningful performance improvement can be obtained in parallel computing by relaxing the data access synchronization requirement to be carried out only for some iterations instead of for each iteration. While this benefit could be achieved by modifying the source code of the program, but this approach is not attractive due to the associated complexity and makes the program non-deterministic. Instead, the methods of the present disclosure employ a compiler that generates the relaxation condition. The resulting application program can be executed in a deterministic manner without performance improvements, or in a relaxed synchronization manner with the associated benefits. Further, the programmer or the compiler can control the degree of synchronization.

Figure 1:
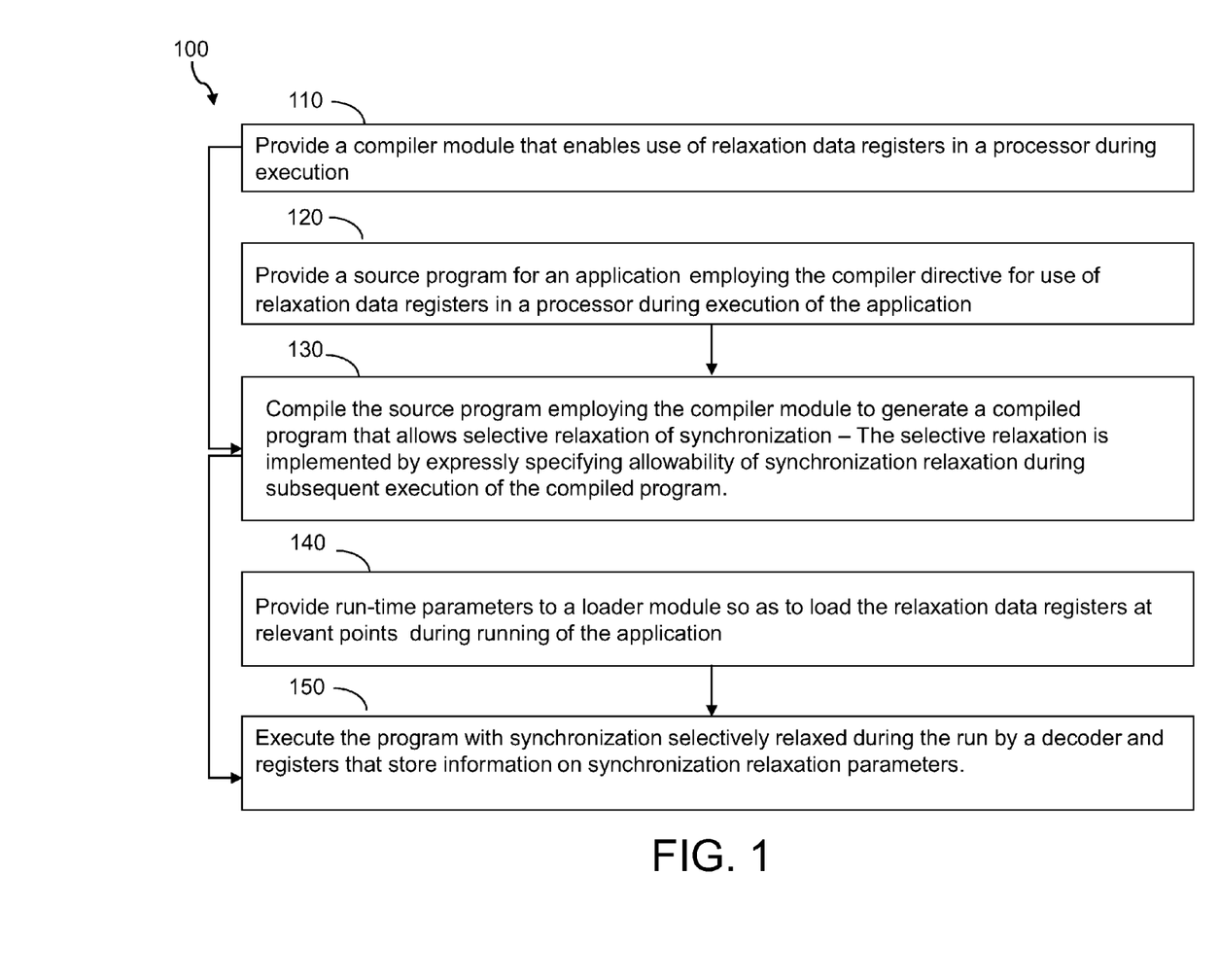
FIG. 1 is a first flow chart illustrating a first method for selectively relaxing synchronization according to a first embodiment of the present disclosure

Referring to FIG. 1, a first flow chart 100 illustrates a first method for selectively relaxing synchronization according to a first embodiment of the present disclosure. The first method can be employed to relax synchronization in parallel computing. The first method can be implemented in a system including a plurality of processors and configured for parallel computing and including hardware adapted to provide selective relaxation of synchronization in at least one of the plurality of processors.

Referring to step 110, a compiler module that enables use of relaxation data registers in a processor is provided. The compiler module enables a compiler, i.e., a compiler program, to recognize a compiler directive in the form of a code. The compiler directive communicates to a compiler that additional information is to be added during compilation of a source program in order to generate a compiled program, i.e., an application program that can be executed in a computing means configured for parallel computing.

Referring to step 120, a source program for an application is provided by a programmer. The source program includes at least one instance of the compiler directive that the compiler module enables. The compiler directive, after compilation into an application program, enables use of relaxation data registers in at least one processor to subsequently run the application program generated from the source program. If the relaxation of synchronization is provided in the source program code by the programmer, such relaxation of synchronization can be referred to as "programmer directed relaxation." In one embodiment, at least one quality condition for a solution (to be generated by running an application program) can be specified in a code in the source program.

For illustrative purposes, the method of the first embodiment is described using Open Multi-processing ("OpenMP," or "Open specifications for Multi-Processing developed via collaborative work between interested parties from the hardware and software industry, government and academia") parallelization as a method of implementing parallel programs. It will be clear to those skilled in the art that the disclosure can be practiced for other parallelization methods as well including pthreads (POSIX threads) methods, message passing interface (MPI) method, and transactions.

Concurrent parallel threads can be generated by providing a source code. An exemplary source code for generating concurrent parallel threads may, for example, be:

```
while (converged( ) == false) {
#pragma omp parallel for private(...) shared(shared_var) schedule(..)
    for(....){
        do-independent-work( )
        #pragma omp atomic {
            update shared_var
        }
        do-independent-work( )
    } // implicit barrier( )
} // end while( ).
```

In the above example, the "shared_var" variable refers to a shared variable, and the "do-independent-work" refers to a set of commands to do an independent work. Concurrent parallel threads execute the independent work with no data dependencies, and the computation to update the "shared_var" is done atomically. The execution time of the above code is determined by the execution time of slowest iteration (i.e., slowest thread). Hence, to improve the execution time of the algorithm, it is important to improve the run time of each iteration (including the slowest iteration). One of the key bottlenecks in the iteration execution is the synchronization required for the atomic update of the "shared_var."

A programmer can provide hints in the source program to relax the synchronization so that at least one iteration can be speeded up by not requiring atomic updates to a shared variable, such as "shared_var" in the above example, to be synchronized during execution of an application program. Since each thread could actually execute a chunk of iterations before reaching the implicit barrier, it is possible to skip synchronization for some (or all) iterations executed by each thread.

For example, the above exemplary source code can be modified to include a user provided hint, which can have a syntax such as "#pragma relax ICC," for possible synchronization relaxation. The modified exemplary source code can be:

```
#pragma relax ICC
while (converged( ) == false) {
#pragma omp parallel for private(...) shared(shared_var) schedule(..)
    for(....){
        do-independent-work( )
        #pragma omp atomic {
            update shared_var
        }
        do-independent-work( )
    } // implicit barrier( )
} // end while( )
```

In the above exemplary source code, "#pragma relax ICC" is a hint, which is also a construct by which the programmer directs the compiler to relax synchronization. The hint is a directive communicating additional information to the compiler. The compiler module enables the compiler to recognize these types of hints so that the compiled program, i.e., the application program, which the compiler generates, includes instructions for relaxing synchronization.

Referring to step 130, an application program is generated from the source program by compiling the source program employing the compiler module and a compiler. The compiler can run in at least one computing means which includes at least one processing unit such as a processor. The at least one computing means can be any computing device configured to run a compiler employing the compiler module. For example, the at least one computing means can include at least one computer. The application program includes a code for storing data representing a mode for relaxing synchronization in the relaxation data registers. The selective relaxation is implemented by expressly specifying allowability of synchronization relaxation during subsequent execution of the compiled program, i.e., the application program.

In one embodiment, the compiler can profile (i.e., iteratively compile, execute and observe the behavior of the application program) combinations of synchronization commands and data structure classes to be synchronized according to the source program to determine whether selective relaxation of synchronization can effectively accomplish the purpose of the source program. At least one combination of a data structure class and a synchronization command, in which a frequency of synchronization is reducible to a level less than 100% of occurrences specified in the source program without projected violation of a quality condition for a solution for the application program, is identified during the profiling. The projection of violation of the quality condition for the solution for the application program at a reduced level of synchronization frequency can be performed, for example, by running a portion of the source program that is intended to produce iterative convergence and by monitoring the rate of convergence.

Compiler makes a choice of which ICCs to relax and for each relaxed ICC which data structures to relax and by how much. In one embodiment, a plurality of ICCs can be marked by the programmer as candidates for relaxed synchronization. In this case, the compiler can choose one or more ICCs in which the commands for synchronized data access are converted to commands for unsynchronized data access.

In another embodiment, the programmer provides command line parameter for the selected set of ICCs for which synchronization relaxation can be enabled. In this embodiment, the application program is not changed, and hence the original application program binary can be used for execution. The parameters provided by the programmer take effect only before the execution of the selected ICCs, and are used to set the corresponding relaxation registers. This hardware-only embodiment allows relaxing synchronization even for pre-compiled libraries—libraries that are available only in binary format—because this embodiment does not require changing the application program.

Figure 2:
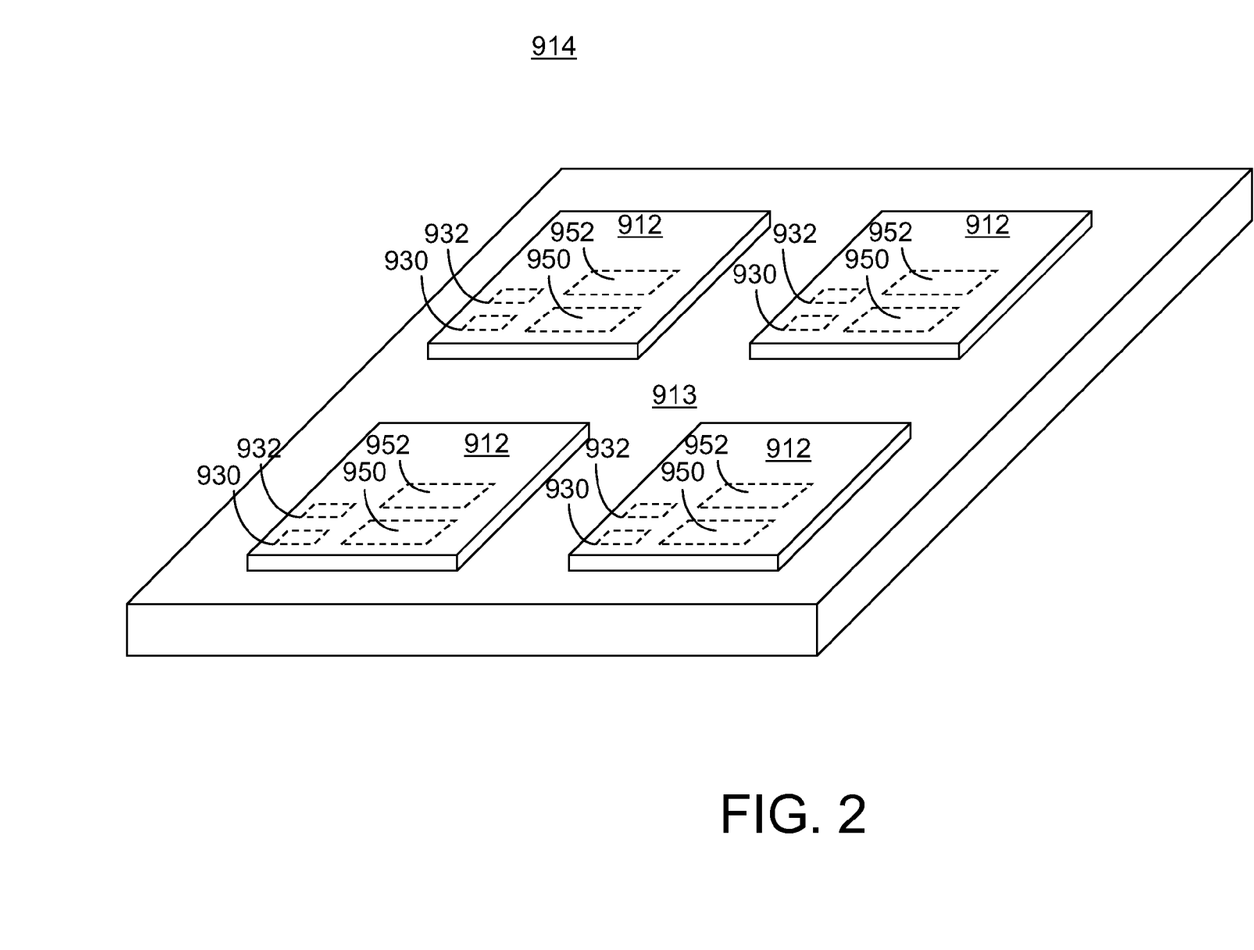
FIG. 2 is an assembly of processors including relaxation data registers and an inter-processor communication hardware according to the first embodiment of the present disclosure.

In yet another embodiment, the application programmer can provide compiler directives in the source code of the application near the function with the ICC to enable relaxing the synchronization. These compiler directives provide the values of the relaxation registers, and these values are subsequently loaded in the hardware relaxation registers prior to the execution of the ICC. This embodiment again does not change the application binary. However, the compiler directives are used at run-time to load the necessary relaxation registers. In the embodiment as well, the application programmer provides the values for the relaxation registers. The application binary is generated by the compiler with an reduction in the frequency of synchronization. The parameter for the reduced frequency of synchronization is transmitted from the compiler directive at run-time, and subsequently stored as data in, the relaxation data registers (930, 932) in the system for parallel computing.

The selective relaxation of synchronization and consequent reduction of synchronization overhead during parallel computing can be implemented employing hardware specifically configured for this purpose. A system configured for parallel computing with selective relaxation of synchronization can be employed. The system for parallel computing includes a plurality of processors configured to run an application in a parallel computing mode. At least one of the plurality of processors includes relaxation data registers and a decoder. The decoder is configured to either convert a command for synchronized data access in an application program into a command for unsynchronized data access or transmit the command for synchronized data access unmodified based on contents of data stored in the relaxation data registers.

Referring to FIG. 2, an assembly 914 of processors 912 including relaxation data registers (930, 932) and inter-processor communication hardware 913 is illustrated. Each processor 912 can include a first relaxation data register 930 configured to store data indicating activation of selective synchronization relaxation and a second relaxation data register 932 configured to store data indicating frequency of selective synchronization relaxation. The inter-processor communication hardware 913 provides signal communication paths for synchronization data to travel through between processors 912. For example, the inter-processor communication hardware 913 can be a packaging substrate including built-in signal paths and configured to mount a plurality of processors 912. Alternately, the inter-processor communication hardware 913 can be a circuit board on which a plurality of processors 912 is mounted. Yet alternately, the inter-processor communication hardware 913 can be a collection of at least one router and signal cables configured to enable transmission of data among the plurality of processors 912.

Referring to step 140, the selective relaxation of synchronization can be implemented at run time, i.e., during running of the application program. At the time of execution of the application, the programmer can specify parameters to the loader module. These parameters can be of the form of the name of the ICC in the application program, and the relaxation factor for that ICC. Thus, run-time parameters can be provided to a loader module so as to load the relaxation data registers (930, 932) at relevant points during running of the application. At the time of execution of the application program, prior to the execution of the selected ICC, the loader module stores the programmer specified parameters in a set of special registers, i.e., the first relaxation data register 930 and the second relaxation data register 932. Prior to the execution of the ICC, the loader module can set the first relaxation data register 930, for example, from a default value of "0" representing absence of selective relaxation of synchronization to a value of "1" representing enablement of selective relaxation of synchronization. The first relaxation data register 930, which is also referred to as a "relax register," remains set until an implicit barrier is seen by the loader module. The implicit barrier refers to the end of the ICC.

The second relaxation data register 932, which is also referred to as a "relax factor register," tracks the granularity of synchronization relaxation. For example, the second relaxation data register 932 stores data for integer k (greater than 1), which can be employed to relax synchronization once for every k iterations.

Each processor 912 includes an opcode mapper table 950. Optionally, each processor 912 may include a memory 952 for loading a thread or is in communication with a memory unit (not shown) that stores at least one thread to be run on the processor 912.

Referring back to step 130, the data stored in the relaxation data registers (930, 932) can enable for a given ICC, the frequency of synchronization to be reduced to a level less than 100% of occurrences specified in the source program without projected violation of a quality condition for a solution for the application program. During running of the application program, at least one command for synchronized data access among the at least one combination in the application program is decoded as at least one command for unsynchronized data access.

In one embodiment, a fraction of commands for synchronized data access corresponding to each combination in the source program can be executed as commands for unsynchronized data access during the running of the application program. This fraction is greater than a ratio between the reduced frequency of synchronization to the corresponding frequency of synchronization and is less than 1. The at least one parameter for the reduced frequency of synchronization can include information representing this fraction.

The at least one command for unsynchronized data access in the application program can include, for example, at least one of an unsynchronized read command and an unsynchronized write command.

Referring to step 150, the application program is run, i.e., executed, in the system for parallel computing while the data representing the mode of selective relaxation of synchronization are stored in the relaxation data registers (930, 932). Thus, at least one command for synchronized data access in the application program is decoded as at least one command for unsynchronized data access based on the data stored in the relaxation data registers (930, 932).

In one embodiment, data indicating enablement of selective synchronization relaxation can be stored in the first relaxation data register 930 among the relaxation data registers (930, 932) before running the selected ICC of the application program. See FIG. 2. Further, data indicating frequency of selective synchronization relaxation can be stored in the second relaxation data register 932 among the relaxation data registers (930, 932) before running the selected ICC of the application program.

While the first relaxation data register 930 is set at a value indicating enablement of selective relaxation of synchronization, a "relax" mode is turned on. Any atomic update instructions (such as synchronized read instructions and synchronized store instructions) seen by the decoder is interpreted (decoded) differently from the usual manner during the relax mode. For example, a Content Addressable Memory (CAM) lookup of a special opcode mapper table, such as the opcode mapper table 950 in FIG. 2, can be employed in the hardware. The opcode mapper table 950 maps the atomic instructions seen in the code to the appropriate opcodes to be used in the "relaxed" mode. For example, the mapper could return a regular load word instruction for a command for a synchronized load word instruction, and a regular store word instruction for a synchronized store word instruction.

The new instructions, i.e., the unsynchronized instructions or "regular" instructions, are now executed as if they were present in the application's binary code, i.e., in the application program. The advantages of using a hardware implementation include the absence of any change to the application binary code, and the ability to turn on or off the user provided hint to switch from normal synchronization mode (that requires 100% of synchronized commands to be performed during run time) to the relaxed synchronization mode (that requires less than 100% of synchronized commands to be performed during run time, while allowing the rest to be replaced with unsynchronized commands). The hardware embodiment does not require any changes to the Instruction Set Architecture (ISA)s, or the application binary. This embodiment incurs the additional overhead of a change to the processor's decode stage of the pipeline. Additional mapper tables can be used to determine the equivalent instructions to use in the relaxed mode.

Figure 3:
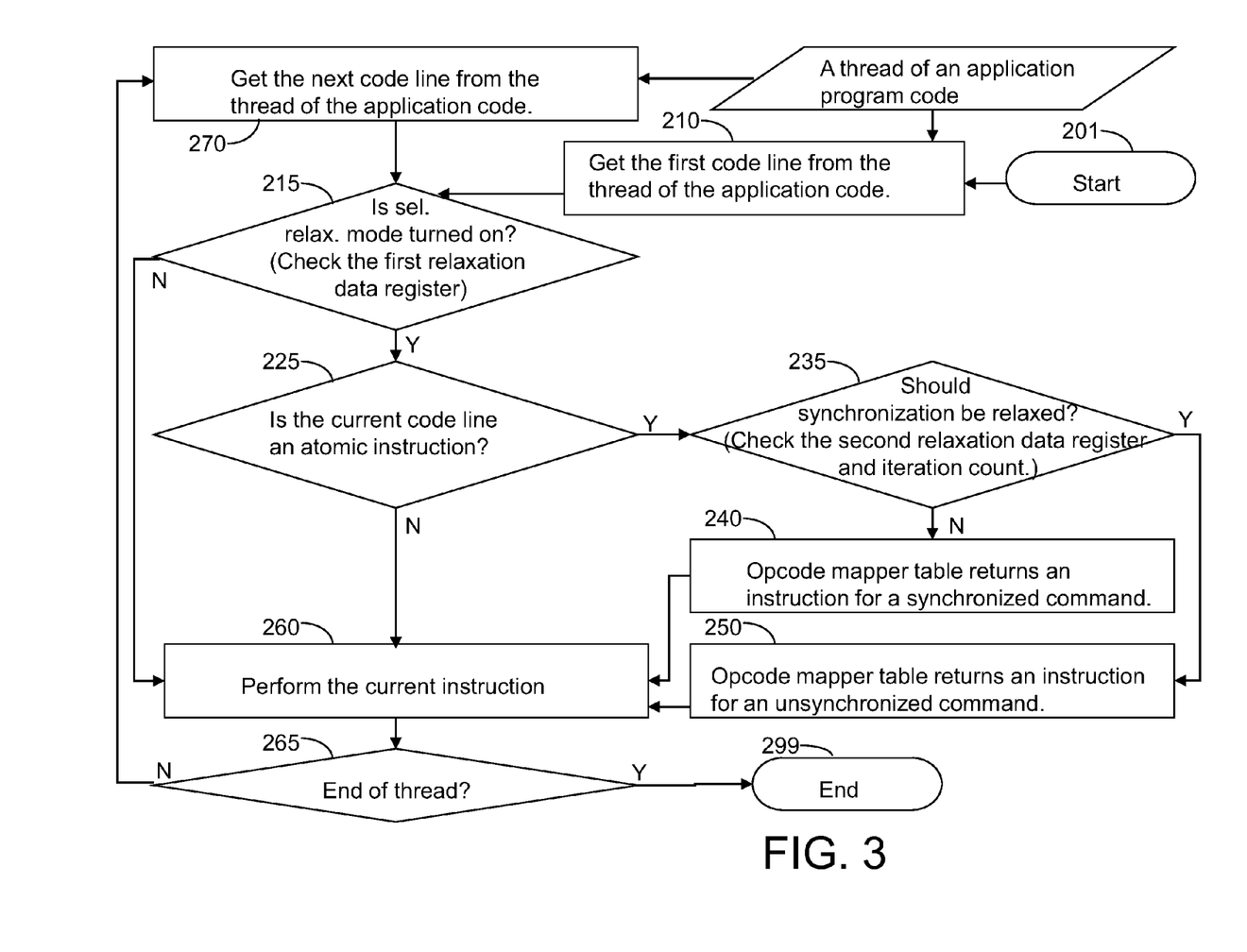
FIG. 3 is a schematic flow diagram that can be employed by each of the processors in an assembly of processors according to the first embodiment of the present disclosure.

Referring to FIG. 3, a schematic flow diagram that can be employed by each of the processors 912 is shown. A thread of an application program is stored in a memory 952 within a processor 912 or a memory unit that is shared among processors 912 within an assembly 914 of processors 912. Referring to steps 201 and 210, upon commencement of running of the thread of the application program code on the processor 912, the first code line from a thread of the application code that is assigned to the processor is fetched from a memory 952 attached to the processor 912 or a memory unit shared among the processors 912. At step 215, if the corresponding relaxation registers in the hardware are set, then the relaxation of synchronization is enabled.

To make this determination, the value stored at the first relaxation data register 930 is checked. If the selective relaxation mode is not turned on, the opcode mapper table 950 returns corresponding instructions without any relaxation at step 220, i.e., all codes for atomic instructions are performed as atomic instructions during run time.

If the selective relaxation mode is turned on, the code is examined by the processor to determine if the current code line is a code for an atomic instruction at step 225. If the code is not a code for an atomic instruction, the opcode mapper returns a corresponding instruction at step 220. If the code is a code for an atomic instruction, the opcode mapper checks the second relaxation data register 932 and the iteration count within the thread. The determination as to whether the code mapper should return an instruction for a synchronized command or an instruction for an unsynchronized command is made based on the data stored in the second relaxation data register 932 and the iteration count.

For example, the opcode mapper may be programmed to return an unsynchronized command for an atomic instruction only when the iteration count (with or without any offset value to the actual number of iterations performed so far) within the thread is an integer multiple of the value stored within the second relaxation data register 932, or may be programmed to return an unsynchronized command for an atomic instruction only when the iteration count within the thread is not an integer multiple of the value stored within the second relaxation data register 932. The value stored in the second relaxation data register may be a positive integer greater than 1. Thus, the opcode mapper table 950 returns an instruction for an unsynchronized command for a code for an atomic instruction (an instruction for a synchronized command) in step 250, or an instruction for a synchronized command for a code for an atomic instruction in step 240.

Referring to step 260, the current instruction is performed in the processor 912. At step 265, a determination is made as to whether the end of the execution has been reached. If the end of the execution is reached, the thread ends at step 299. Otherwise, step 270 is performed, at which the next code line in the thread is fetched from the memory.

In one embodiment, at least one of the one set of compiler directives is present to allow selective relaxation of synchronization on a combination of a data class and a synchronization command, and at run-time these directives are used to store the parameters to the relaxation data registers as data.

In one embodiment, at least one of the plurality of processors can be configured to convert every k-th command for synchronized data access within a combination of a data class and a synchronization command in the application program into the command for unsynchronized data access, and transmit unmodified other commands for synchronized data access within the combination. The integer k is greater than 1.

In another embodiment, at least one of the plurality of processors is configured to transmit unmodified every k-th command for synchronized data access within a combination of a data class and a synchronization command in the application program, and convert other commands for synchronized data access within the combination into the command for unsynchronized data access. The integer k is greater than 1.

An application program may have a format as illustrated in the following exemplary application program:

```
#if RELAX
    <directive to set relax register>
    <directive to set relax_factor>
#endif
Loop1 :
# parallel computation
# lock acquisition and atomic update
Loop2: lwarx r5,0,r3 # Load and reserve         CAM lookup to load
                                                 word
    stwcx. r4,0,r3 # Store new value if reserved  CAM lookup to
                                                 store word
    bne- Loop2 # Loop if lost reservation        CAM to nop
bc Loop1 # if did not converge, go to Loop1
```

Figure 4:
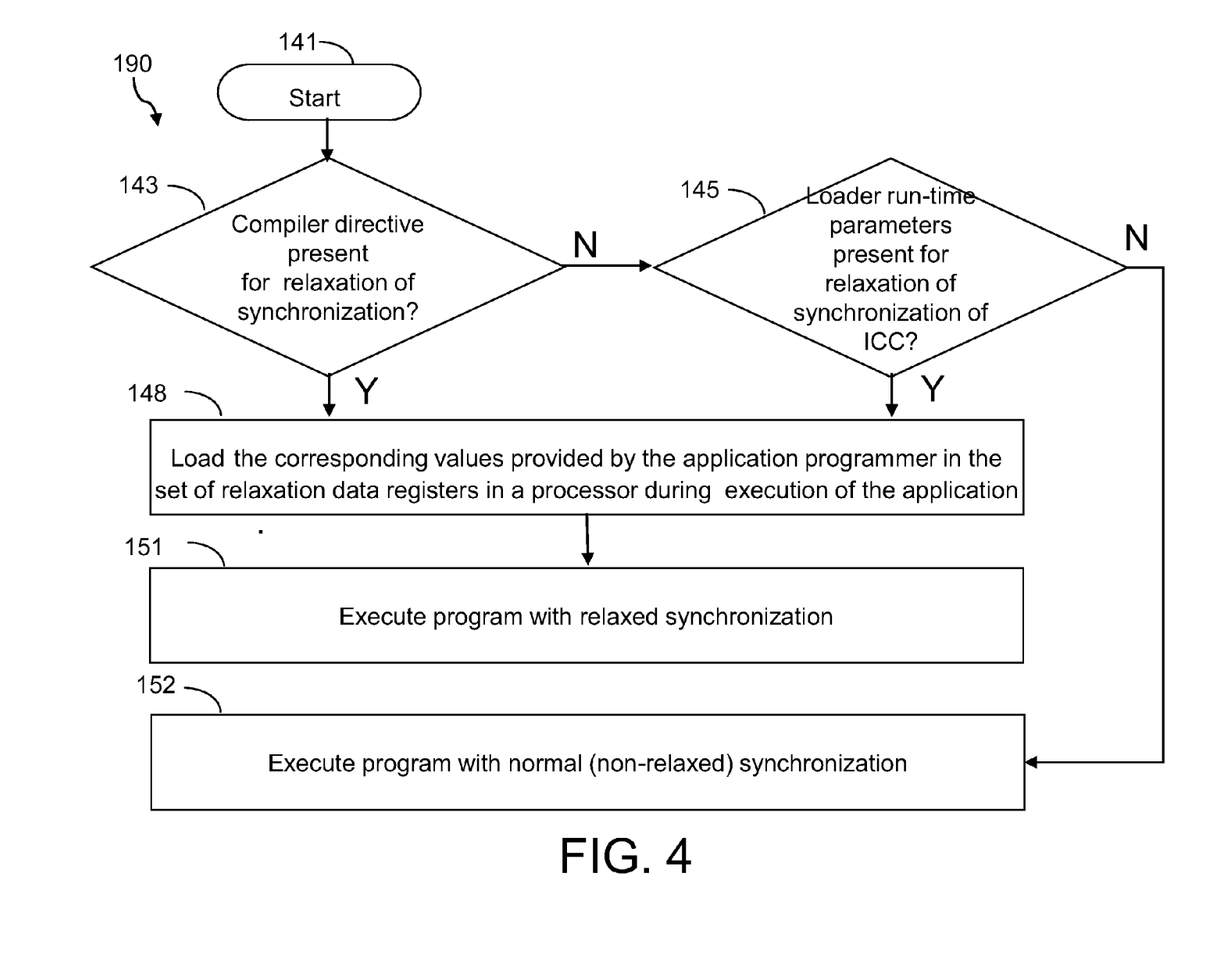
FIG. 4 is a schematic flow diagram that can be employed by a processor to allow relaxation of synchronization during run-time according to the first embodiment of the present disclosure.

Referring to FIG. 4, a flow chart 190 illustrates exemplary steps that can be employed to enable relaxation of synchronization at a processor according to the method of the first embodiment. The steps in the flow chart 190 correspond to steps 140 and 150 in the first flow chart 100.

The starting step 141 corresponds to the beginning of step 140 in the first flow chart 100. At step 403, the application program is examined to determine whether a compiler directive for relaxation of synchronization is present. If a compiler directive or relaxation of synchronization is present in the application program, the process flow proceeds to step 148 to load the corresponding values provided by the application programmer in the set of relaxation data registers (930, 932) in a processor during execution of the application program.

If a compiler directive or relaxation of synchronization is not present in the application program, the application program is examined to determine whether loader run-time parameters are present for relaxation of synchronization of iterative convergent computation (ICC) at step 145. If loader run-time parameters are present in the application program, the process flow proceeds to step 148.

If loader run-time parameters are not present in the application program, the process flow proceeds from step 145 to step 152 so that the application program is run without relaxation of synchronization.

Upon loading the corresponding values provided by the application programmer in the set of relaxation data registers (930, 932) at step 148, the process flow proceeds to step 151 so that the application program is run with selective relaxation of synchronization as described above. Steps 151 and 152 collectively correspond to step 150 in the first flow chart 150.

Figure 5:
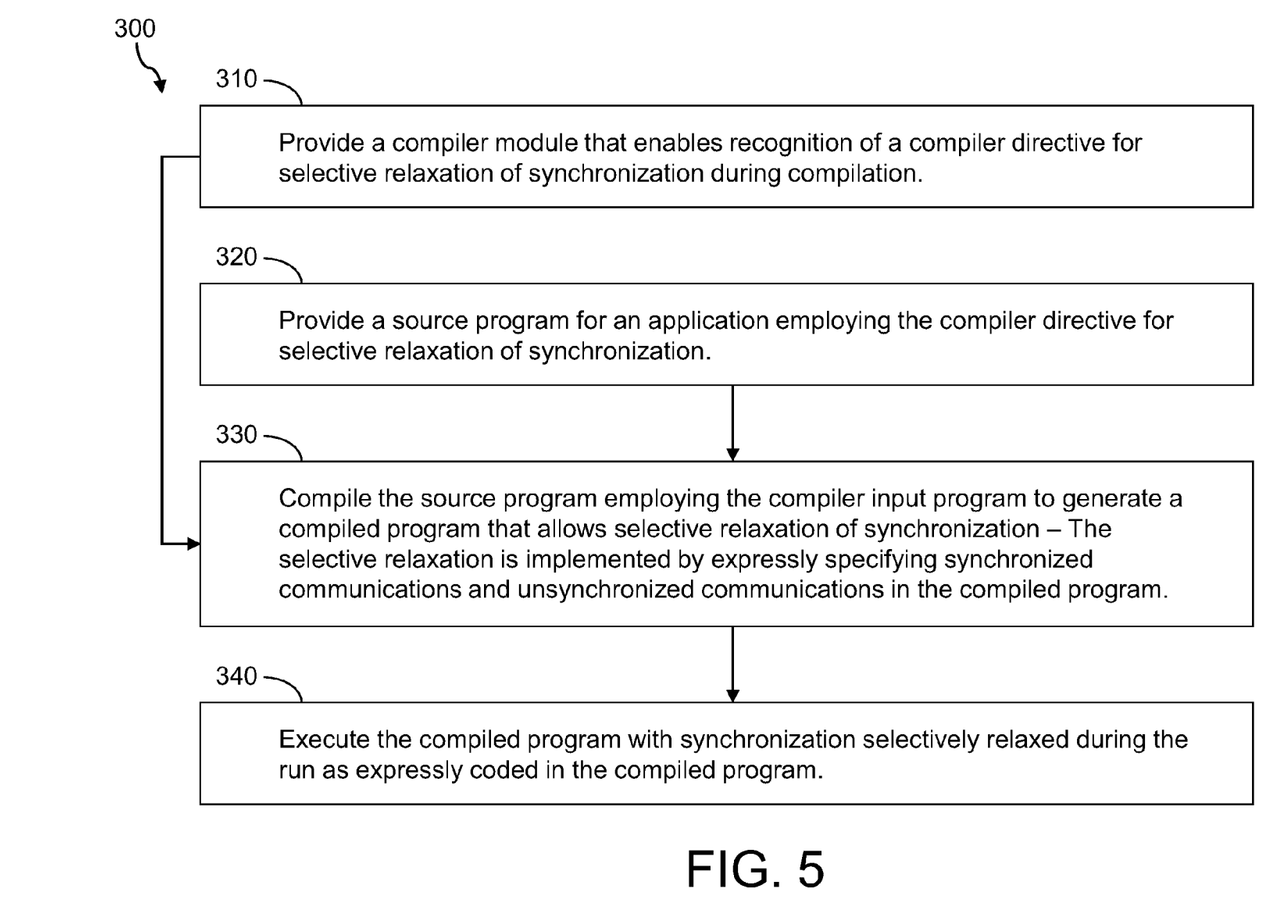
FIG. 5 is a second flow chart illustrating a second method for selectively relaxing synchronization according to a second embodiment of the present disclosure

Referring to FIG. 5, a second flow chart 300 illustrates a second method for selectively relaxing synchronization according to a second embodiment of the present disclosure. The second method can be employed to relax synchronization in parallel computing. The second method can be implemented in any system including a plurality of processors and configured for parallel computing as known in the art.

Referring to step 310, a compiler module is provided that enables recognition of a compiler directive for selective relaxation of synchronization during compilation. The compiler module enables the compiler to recognize a compiler directive in the form of a code. The compiler directive communicates to a compiler that additional information is to be added during compilation of a source program in order to generate a compiled program, i.e., an application program that can be executed in a computing means configured for parallel computing.

Referring to step 320, a source program for an application is provided by a programmer. The source program includes at least one instance of the compiler directive that the compiler module enables. The compiler directive, after compilation into an application program, enables use of relaxation data registers in at least one processor to subsequently run the application program generated from the source program. If the relaxation of synchronization is provided by a code provided by the programmer, such relaxation of synchronization can be referred to as "programmer directed relaxation." In one embodiment, at least one quality condition for a solution (to be generated by running an application program) can be specified in a code in the source program.

Referring to step 330, a compiler program can be run in at least one computing means to generate an application program, i.e., a compiled program, from the source program. The compiler compiles the source program employing the compiler module.

The application program that allows selective relaxation of synchronization. The selective relaxation is implemented by expressly specifying synchronized data access and unsynchronized data access in the application program. At least one command for synchronized data access in the source program is compiled as at least one command for unsynchronized data access in the application program.

The compiler is enhanced to insert relaxation code for some iterations for each thread within the parallel loop. The compiler determines using profiling if the algorithm converges to a desired solution in a reasonable time. For example, the compiler's relaxation can be effected by employing a source code, i.e., a code in a source program, such as:

```
#pragma relax ICC
while (converged( ) == false) {
#pragma omp parallel for private(...) shared(shared_var) schedule(..)
for(....){
do-independent-work( )
if (iteration % relax_factor == 0) {
update shared_var
} else {
#pragma omp atomic
{ update shared_var }
}
do-independent-work( )
} // implicit barrier( )
} // end while( )
```

In the above code, "relax_factor" determines the degree of relaxation, i.e., how many iterations per thread will relax atomic updates.

In one embodiment, a plurality of synchronization points in the source program can be marked with a hint. In the above exemplary code, the hint is provided by the compiler directive of "#pragma relax ICC." The plurality of synchronization points can be contained in an iterative loop as in the above exemplary code. The compiler can assign priority for compilation as commands for unsynchronized data access to commands for synchronized data access in the marked plurality of synchronization points over commands for synchronized data access in unmarked synchronization points.

Figure 6:
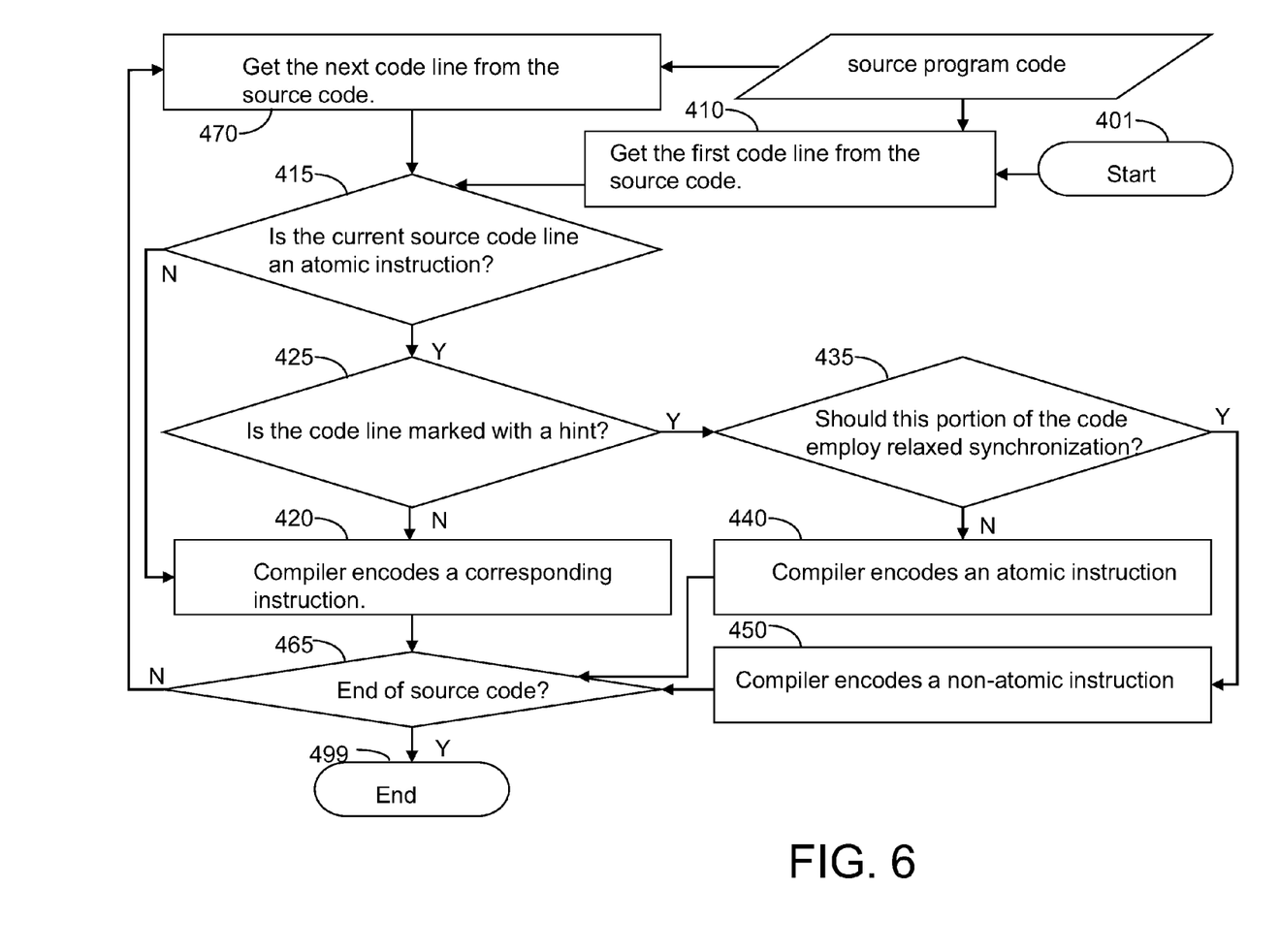
FIG. 6 is a schematic flow diagram that can be employed by a compiler to perform the step of 330 in FIG. 5 according to the second embodiment of the present disclosure.

Referring to FIG. 6, a schematic flow diagram that can be employed by a compiler to perform the step of 330 is shown. The source program is loaded into a memory within a processor or a memory unit shared by multiple processors. Referring to steps 401 and 410, upon commencement of compilation of the source code on a processor (or a set of processors), the first code line from the source code is fetched from a memory attached to the processor or a memory unit in communication with the processor, which can be a processor 912 or an assembly 914 of processors 912 illustrated in FIG. 3 or any other processor(s). At step 215, the code line is examined to determine if the code line includes an atomic instruction.

If the code line does not include an atomic instruction, the compiler encodes a corresponding instruction in a compiled program, i.e., in the application program, at step 420.

If the code line does not include an atomic instruction, at step 425, the compiler examines the code to determine if the code line is marked with a hint. The compiler may examine adjacent code lines to determine whether the current code line is marked with a hint that authorizes the use of selective relaxation of synchronization during compilation (and run time as a consequence). If no hint is present for the current code line in the source code, the compiler encodes a corresponding instruction (which is an atomic instruction) at step 220. If a hint is present for the current code line in the source code, the compiler program proceeds to step 435. The determination as to whether the compiler should employ relaxed synchronization for this portion of the code is made preliminary evaluation of the nature of iterative computation employed within this portion of the source code and data stability as assessed by the compiler at step 435.

In one embodiment, the compiler profiles combinations of synchronization commands and data structure classes to be synchronized according to a code in the source program to determine whether selective relaxation of synchronization can effectively accomplish the purpose of the source program at step 435. During the compilation, at least one combination of a data structure class and a synchronization command is identified in which a frequency of synchronization is reducible to a level less than 100% of the occurrences specified in the source program without projected violation of a quality condition for a solution for the application program.

In one embodiment, the compiler can generate, for each of the at least one combination, a reduced frequency of synchronization at step 435. The reduced frequency of synchronization is selected to be not less than a minimum frequency of synchronization that avoids projected violation of the quality condition, and to be less than corresponding frequency of synchronization specified in the code in the source program.

The compiler encodes an instruction for an unsynchronized command (for an atomic instruction) only when the compiler determines that such relaxation does not result in projected violation of a quality condition for a solution to be solved by a compiled program (application program) to be generated from the source program. Thus, the compiler may encode a non-atomic instruction (an instruction for an unsynchronized command) for a code line for an atomic instruction within the source code in step 450, or an atomic instruction (an instruction for a synchronized command) for a code for an atomic instruction within the source code in step 440.

Referring to step 465, a determination is made as to whether the end of the source code has been reached. If the end of the source code is reached, the compilation process is completed at step 499. Otherwise, step 470 is performed, at which the next code line in the source code is fetched from the memory.

Thus, a fraction of commands for synchronized data access corresponding to a combination in the source program can be compiled as commands for unsynchronized data access in the application program. The fraction is greater than a ratio between the reduced frequency of synchronization to the corresponding frequency of synchronization and is less than 1.

In one embodiment, a command for unsynchronized data access in the application program can include at least one of an unsynchronized read command and an unsynchronized write command.

The programs for implementing the second method can be embodied, i.e., stored, in a non-transitory machine readable data storage medium. Non-transitory machine readable data storage media include any non-transitory media (excluding signals in electromagnetic radiation or other types traveling waveform in free non-confined media) known in the art. For example, non-transitory machine readable data storage media can be a DVD ROM, a CD ROM, a hard disk, a magnetic tape, a portable USB drive, or any other data storage device configured to store electronic data.

The programs can include a compiler module, which includes a code for enabling recognition of a compiler directive for selective relaxation of synchronization during compilation. Further, the program can include a compiler, i.e., a compiler program, configured to recognize the compiler input program and to compile at least one command for synchronized data access in a source program as at least one command for unsynchronized data access in an application program upon detection of the compiler directive for selective relaxation of synchronization.

The compiler can be configured to perform the steps of profiling combinations of synchronization commands and data structure classes to be synchronized according to a code in the source program, and identifying at least one combination of a data class and a synchronization command so that a frequency of synchronization is reducible to a level less than 100% of the occurrences specified in the source program without projected violation of a quality condition for a solution for the application program in the at least one combination.

Further, the compiler can be configured to perform a step of generating, for an identified combination, a reduced frequency of synchronization that is not less than a minimum frequency of synchronization that avoids projected violation of the quality condition and less than corresponding frequency of synchronization specified in the code in the source program.

The at least one non-transitory machine readable data storage medium can also be employed to store the source program that includes at least one of the compiler directive.

Referring to step 340, the application program can be run in a system including a plurality of processors and configured for parallel computing. Synchronization is selectively relaxed during the run as expressly coded in the application program.

The at least one non-transitory machine readable data storage medium can also be employed to store the application program. The application program includes at least one command for unsynchronized data access corresponding to at least one command for synchronized data access within a combination of a data class and a synchronization command in the source program, and at least another command for synchronized data access corresponding to at least another command for synchronized data access within the combination.

Figure 7:
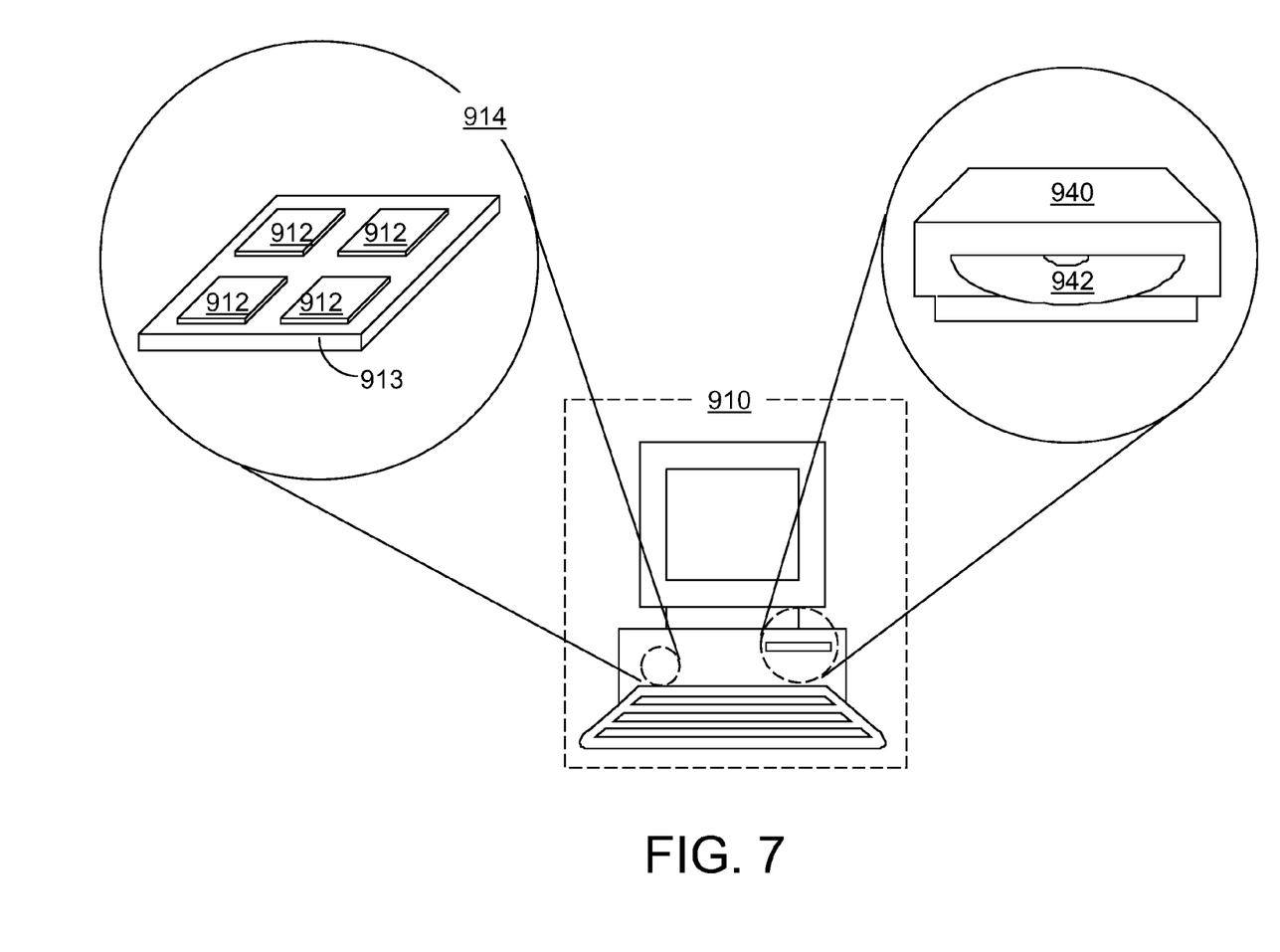
FIG. 7 is a first exemplary system configured to implement the methods of the embodiments of the present disclosure.

Referring to FIG. 7, a first exemplary system configured to implement the methods of the embodiments of the present disclosure is shown. The first exemplary system includes a computing means 910, which includes an assembly 914 of processors 912 therein. The processors 912 can include relaxation data registers (930, 932) and inter-processor communication hardware 913 as illustrated in FIG. 2 for implementation of the first embodiment, or can be any type of multiple processors connected through inter-processor communication hardware for implementation of the second embodiment.

The at least one non-transitory machine readable data storage medium employed to store programs of any of the above embodiments can be located within the computing means 910, for example, as a hard disk, outside the computing means 910, for example, as a database, or as a portable non-transitory machine-readable data storage medium 942 such as a CD ROM or a DVD ROM. A data-writing device 940 may be provided in the computing means 910 to enable encoding of any program employed in this disclosure.

The at least one non-transitory machine readable data storage medium is a computer program product, which may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit, as mentioned, or may be located on a remote system such as a server (not shown), coupled to the processing unit, via a network interface such as an Ethernet interface. A monitor, a mouse, a keyboard, and any other human interface device can be coupled to the processing unit, to provide user interaction. A scanner (not shown) and/or a printer (not shown) may be provided for document input and output.

Figure 8:
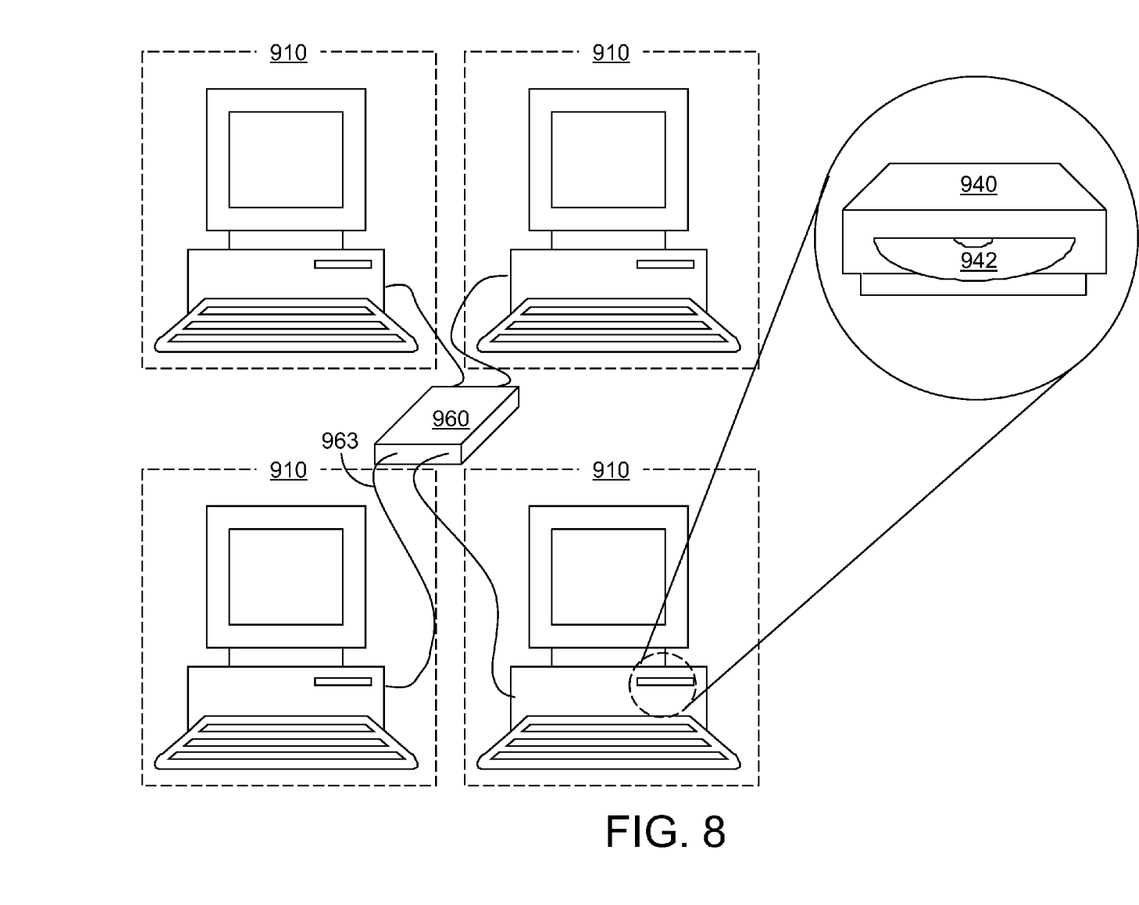
FIG. 8 is a second exemplary system configured to implement the methods of the embodiments of the present disclosure.

Referring to FIG. 8, a second exemplary system configured to implement the methods of the embodiments of the present disclosure is shown. The second exemplary system includes a plurality of computing means 910, each of which includes a processor or an assembly of processors as illustrated in FIG. 7. The processor or the assembly of processors can include relaxation data registers and inter-processor communication hardware as illustrated in FIG. 2 for implementation of the first embodiment, or can be any type of multiple processors connected through inter-processor communication hardware for implementation of the second embodiment.

The plurality of computing means 910 are interconnected among one another through an inter-processor communication device 960, which can be a router or any other routing device, and data cables 963. One or more of the plurality of computing means 910 can be provided with a monitor and/or a data-writing device 940.

The above embodiments are chosen for illustrative purposes only, and it will be clear to those skilled in the art to practice the disclosure using modifications to other stages of the pipeline as well. For example, a pre-decode stage may be employed to store the pre-decoded instructions in the instruction cache. Therefore, subsequent execution of these instructions will not have to be decoded in the above manner, and this could further improve the overall execution time.

The methods for relaxing synchronization can be employed in a parallel computing system employing distributed shared memory. Distributed programs do not use locks, but use communication primitives such as blocking send/receives (as in MPI) or blocking communication queues or message buffers, to synchronize. To relax such communication based synchronization, communicators (sender or receiver) are allowed to use stale values. This can be realized by allowing the receiver to operate using stale data, and to synchronize with the sender once every few iterations. The frequency of the reduced synchronization can be determined by a parameter employed during the run time, such as "relax_factor" in the exemplary code. It is also possible to enhance the MPI library to support synchronization relaxation transparently employing the methods of the present disclosure. Thus, the synchronization relaxation of the present disclosure can be implemented in a distributed shared memory system as well.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A method of relaxing synchronization in a parallel computing system, said method comprising:
   providing a system including a plurality of processors, said plurality of processors including at least one processor containing relaxation data registers and decoders;
   generating an application program from a source program, said application running multiple processing threads in parallel, at least one thread performing iterative convergent computations in an iterative loop, wherein said application program includes an instruction for storing data representing a mode of synchronization relaxation in one of said relaxation data registers; and
   running said application program in said system to store said data in said relaxation data registers, wherein said system decodes at least one command in said application program for synchronized data access between processors in said system as at least one command for unsynchronized data access based on said stored data, said at least one command for unsynchronized data access employed to substitute an atomic operation applied to a variable in an iterative loop with a non-atomic operation.

2. The method of claim 1, further comprising:
   storing data indicating activation of said mode of synchronization relaxation in a first relaxation data register among said relaxation data registers; and
   storing data indicating frequency of synchronization relaxation in a second relaxation data register among said relaxation data registers.

3. The method of claim 1, further comprising generating said application program by compiling said source program employing a compiler module including a compiler that runs in at least one computing means, said compiler module including instruction to store said data in said relaxation data registers, and said source program includes at least one instance of a compiler directive that enables said mode for synchronization relaxation.

4. The method of claim 3, further comprising profiling, employing said compiler, combinations of synchronization commands and data classes to be synchronized according to said source program, wherein at least one combination of a data class and a synchronization command is identified during said profiling, wherein a frequency of synchronization in said at least one combination is reducible to a level less than 100% of occurrences specified in said source program without projected violation of a quality condition for a solution to be generated from said application program.

5. The method of claim 4, further comprising marking a plurality of synchronization points in said source program with a hint, wherein said compiler assigns priority for identification as said at least one combination to commands for synchronized data access in said marked plurality of synchronization points over commands for synchronized data access in unmarked synchronization points.

6. The method of claim 4, wherein said data stored in said relaxation data registers identify said at least one combination, and at least one command for synchronized data access among said at least one combination in said application program is decoded as at least one command for unsynchronized data access.

7. The method of claim 6, further comprising:
generating for one of said at least one combination, employing said compiler, a reduced frequency of synchronization that is not less than a minimum frequency of synchronization that avoids projected violation of said quality condition and less than corresponding frequency of synchronization specified in said source program; and
transmitting, employing said system, to said relaxation data registers parameters for said reduced frequency of synchronization.

8. The method of claim 7, wherein a fraction of commands for synchronized data access corresponding to said one of said at least one combination in said source program is executed as commands for unsynchronized data access during said running of said application program, wherein said fraction is greater than a ratio between said reduced frequency of synchronization to said corresponding frequency of synchronization and is less than 1.

9. The method of claim 1, wherein said at least one command for unsynchronized data access in said application program includes at least one of an unsynchronized read command and an unsynchronized write command.

10. A method of relaxing synchronization in a parallel computing system, said method comprising:
providing a system including a plurality of processors, said plurality of processors including at least one processor containing relaxation data registers and decoders;
providing an application program and a set of parameters, said application running multiple processing threads in parallel, at least one thread performing iterative convergent computations in an iterative loop, and wherein the set of parameters include values for storing data representing a mode of synchronization relaxation in one of the relaxation data registers; and
running said application program in said system to store said data in said relaxation data registers, wherein said system decodes at least one command in said application program for synchronized data access between processors in said system as at least one command for unsynchronized data access based on said stored data, said at least one command for unsynchronized data access substituting an atomic operation applied to a variable in an iterative loop with a non-atomic operation.

11. The method of claim 10, further comprising:
storing data indicating activation of said mode of synchronization relaxation in a first relaxation data register among said relaxation data registers; and
storing data indicating frequency of synchronization relaxation in a second relaxation data register among said relaxation data registers.

12. The method of claim 10, wherein said data stored in said relaxation data registers identify at least one combination of synchronization commands and data classes to be synchronized, and at least one command for synchronized data access, which is present among said at least one combination and is provided in said application program, is decoded as at least one command for unsynchronized data access.

13. A method of relaxing synchronization in parallel computing, said method comprising:
providing a compiler module that enables recognition of a compiler directive for selective relaxation of synchronization during compilation;
providing a source program for an application, said source program including at least one instance of said compiler directive;
generating, employing a complier program that runs in at least one computing means, an application program from said source program by compiling said source program, said application running multiple processing threads in parallel, at least one thread performing iterative convergent computations in an iterative loop wherein at least one command for synchronized data access in said source program is compiled as at least one command for unsynchronized data access in said application program, said at least one command for unsynchronized data access substituting an atomic operation applied to a variable in an iterative loop with a non-atomic operation; and
running said application program in a system including a plurality of processors and configured for parallel computing.

14. The method of claim 13, further comprising marking a plurality of synchronization points in said source program with a hint, wherein said compiler assigns priority for compilation as commands for unsynchronized data access to commands for synchronized data access in said marked plurality of synchronization points over commands for synchronized data access in unmarked synchronization points.

15. The method of claim 13, further comprising profiling, employing said compiler, combinations of synchronization commands and data classes to be synchronized according to a code in said source program, wherein at least one combination of a data class and a synchronization command is identified during said profiling, wherein a frequency of synchronization is reducible to a level less than 100% of the occurrences specified in said source program without projected violation of a quality condition for a solution for said application program in said at least one combination.

16. The method of claim 15, further comprising generating for one of said at least one combination, employing said compiler, a reduced frequency of synchronization that is not less than a minimum frequency of synchronization that avoids projected violation of said quality condition and less than corresponding frequency of synchronization specified in said code in said source program.

17. The method of claim 16, wherein a fraction of commands for synchronized data access corresponding to said one of said at least one combination in said source program is compiled as commands for unsynchronized data access in said application program, wherein said fraction is greater than a ratio between said reduced frequency of synchronization to said corresponding frequency of synchronization and is less than 1.

18. The method of claim 13, wherein said at least one command for unsynchronized data access in said application program includes at least one of an unsynchronized read command and an unsynchronized write command.

19. The method of claim 13, further comprising specifying at least one quality condition for a solution to be generated in said source program.

20. A system for parallel computing, said system comprising a plurality of processors configured to run an application in a parallel computing mode, said application running multiple processing threads in parallel, at least one thread performing iterative convergent computations in an iterative loop, wherein at least one of said plurality of processors includes relaxation data registers and a decoder that is configured to either convert a command for synchronized data access in the application program into a command for unsynchronized data access or transmit said command for synchronized data access unmodified based on contents of data stored in said relaxation data registers, wherein said at least one command for unsynchronized data access substitutes an atomic operation applied to a variable in an iterative loop with a non-atomic operation.

21. The system of claim 20, wherein said relaxation data registers include:
   a first relaxation data register configured to store data indicating activation of a mode of synchronization relaxation; and
   a second relaxation data register configured to store data indicating frequency of synchronization relaxation.

22. The system of claim 20, wherein said decoder includes an opcode mapper table which, when looked up with a command for synchronized data access in an application program, returns a command for unsynchronized data access or transmit said command for synchronized data access unmodified based on contents of data stored in said relaxation data registers.

23. The system of claim 20, wherein said at least one of said plurality of processors is configured to decode an application program to determine presence of a code that allows selective relaxation of synchronization on a combination of a data class and a synchronization command, to detect parameters for selective relaxation of synchronization on said combination, and to store said parameters to said relaxation data registers as data.

24. The system of claim 20, wherein said at least one of said plurality of processors is configured to convert every k-th command for synchronized data access within a combination of a data class and a synchronization command in said application program into said command for unsynchronized data access, and transmit unmodified other commands for synchronized data access within the combination, wherein k is an integer greater than 1.

25. The system of claim 20, wherein said at least one of said plurality of processors is configured to transmit unmodified every k-th command for synchronized data access within a combination of a data class and a synchronization command in said application program, and convert other commands for synchronized data access within the combination into said command for unsynchronized data access, wherein k is an integer greater than 1.

26. At least one non-transitory machine readable data storage medium embodying a plurality of programs, said plurality of programs comprising:
   a compiler module including a code for enabling recognition of a compiler directive for selective relaxation of synchronization during compilation; and
   a compiler configured to use said complier module to recognize said compiler directive and to compile at least one command for synchronized data access in a source program as at least one command for unsynchronized data access in an application program upon detection of said compiler directive for selective relaxation of synchronization, wherein said application program runs multiple processing threads in parallel, at least one thread performing iterative convergent computations in an iterative loop, and said at least one command for unsynchronized data access employed substitutes an atomic operation applied to a variable in an iterative loop with a non-atomic operation.

27. The at least one non-transitory machine readable data storage medium of claim 26, wherein said compiler is configured to perform the steps of:
   profiling combinations of synchronization commands and data classes to be synchronized according to a code in said source program; and
   identifying at least one combination of a data class and a synchronization command, wherein a frequency of synchronization is reducible to a level less than 100% of the occurrences specified in said source program without projected violation of a quality condition for a solution for said application program in said at least one combination.

28. The at least one non-transitory machine readable data storage medium of claim 27, wherein said compiler is configured to perform a step of generating, for one of said at least one combination, a reduced frequency of synchronization that is not less than a minimum frequency of synchronization that avoids projected violation of said quality condition and less than corresponding frequency of synchronization specified in said code in said source program.

29. The at least one non-transitory machine readable data storage medium of claim 26, wherein said source program is stored in said at least one-transitory machine readable data storage medium and includes at least one of said compiler directive.

30. The at least one non-transitory machine readable data storage medium of claim 26, wherein said application program is stored in said at least one-transitory machine readable data storage medium and includes:
   at least one command for unsynchronized data access corresponding to at least one command for synchronized data access within a combination of a data class and a synchronization command in said source program; and
   at least another command for synchronized data access corresponding to at least another command for synchronized data access within said combination.

* * * * *